Figure 1:
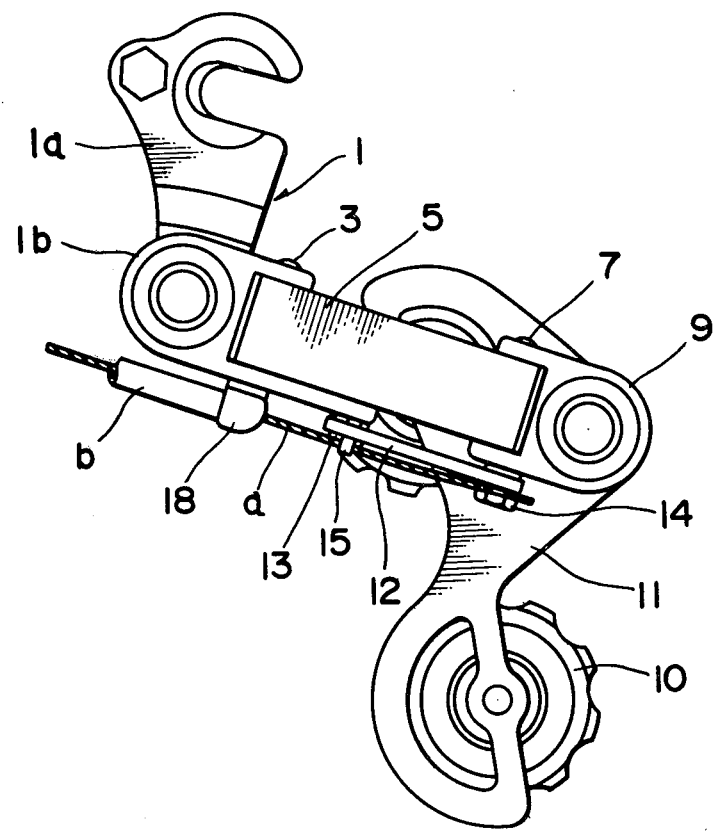

United States Patent [19]

Nagano

[11] 4,030,375
[45] June 21, 1977

[54] DERAILLEUR FOR BICYCLE

[75] Inventor: Masashi Nagano, Sakai, Japan

[73] Assignee: Shimano Industrial Company, Limited, Osaka, Japan

[22] Filed: Mar. 31, 1976

[21] Appl. No.: 672,528

[30] Foreign Application Priority Data

Apr. 9, 1975 Japan .................. 50-43619

[52] U.S. Cl. .................. 74/217 B; 74/242
[51] Int. Cl.² .......... F16H 7/22; F16H 7/00; F16H 7/06
[58] Field of Search .............. 74/217 B, 242

[56] References Cited

UNITED STATES PATENTS

| 3,362,238 | 1/1968 | Hayashi et al. | 74/217 B |
| 3,453,899 | 7/1969 | Tarutani et al. | 74/217 B |
| 3,974,707 | 8/1976 | Nagano | 74/217 B |

Primary Examiner—Samuel Scott
Assistant Examiner—Allan R. Burke
Attorney, Agent, or Firm—Stevens, Davis, Miller & Mosher

[57] ABSTRACT

A derailleur for a bicycle, having four members which include a fitting member, two parallel linkage members and a movable member, among which four members two opposite members comprise one member pivotally supporting a cam plate in swingable relation and another member provided with a pin engageable with the cam face of the cam plate in swinging the cam plate by a pull of a control wire in changing the bicycle speed so that engagement of the cam plate with the pin defines the speed change stage position.

15 Claims, 6 Drawing Figures

DERAILLEUR FOR BICYCLE

This invention relates to a derailleur for a bicycle and more particularly to a derailleur used together with a multi-speed free wheel comprising a plurality, normally three to five of toothed sprockets attached to a rear hub of the bicycle, which derailleur is adapted to shift a driving chain to a selective one of the sprockets.

Conventionally, this kind of derailleur is, as shown in U.K. patent specification No. 888,511 and U.K. patent specification No. 982,986, composed of a fitting member mounted to a bicycle frame, parallel linkage members pivoted to the fitting member, a movable member having chain-guide pulleys pivoted to the parallel linkage members, and a return spring unidirectionally urging the movable member. The derailleur effects the bicycle speed change in the following manner a control lever pulls a control wire for swinging the movable member against the return spring, or for restoring the member, by means of the spring restoration so that the drive chain on the guide pulleys may be shifted to a selective one of the sprockets of the multi-speed free wheel.

A well known derailleur has no mechanism capable of positioning the guide pulleys in each speed change stage. As a result, the positioning should, in the speed change by the lever, depend upon the operator's sensibility only. Accordingly, in the chain shifting, an excessive or shortened lever turn causes a guide cage to be improper in its action to result in unexact speed-change. Hence, there is a defect that the chain hits the sprocket and produces a noise. Also, the operator controls the lever in response to the noise as a clue for adjusting the guide cage to a proper position. Such control requires a certain amount of skill.

On the other hand, U.S. Pat. No. 3,362,238 and U.S. Pat. No. 3,394,604 suggest that at the control lever or a lever-holder thereof there are provided engageable holes having intervals corresponding to the speed change stage respectively and a ball engageable with the holes respectively so that the speed change stage may be defined. In this instance, the ball is so engaged with the hole that the derailleur can be mechanically positioned at a proper speed-change stage to result in a theoretically accurate speed-change operation. However, since the derailleur is operated by the lever through the control wire, occurrence of surplus extension of the wire or contraction of the outer cable may cause the movable member of the derailleur to be out of order, resulting in inaccurate speed-change operation.

Especially in this construction, the lever action to position the derailleur is not noticed by the cyclist. As a result, either the chain guidance is not normal and the cyclist does not notice it immediately, or if he knows it, he will have difficulty adjusting the derailleur to a proper speed-change stage.

In view of the above problems, the invention has been designed. A main object of the invention is to provide a derailleur capable of always exactly shifting the drive chain by correcting the lever's improper action, i.e., somewhat excessive or shortened lever turn, and of being kept in its speed-change position. Another object of the invention is to provide a derailleur capable of correcting surplus extension of the wire or contraction of the outer cable with respect to the wire so that the chain may be exactly shifted. Still another object is to provide a derailleur simple in construction, applicable to a conventional lever and shiftable of the drive chain by means of a single wire with attendance of obtaining the above purposes.

The present invention is characterized in that a cam plate having a retainer for the control wire is pivoted to one of four members constituting the derailleur, i.e., a first mounting member, a second and third linkage members, and a fourth movable member, and in that to another member movable relative to the member with the pivoted cam plate is fixed a pin engageable with the cam face of the cam plate.

Figure 2:
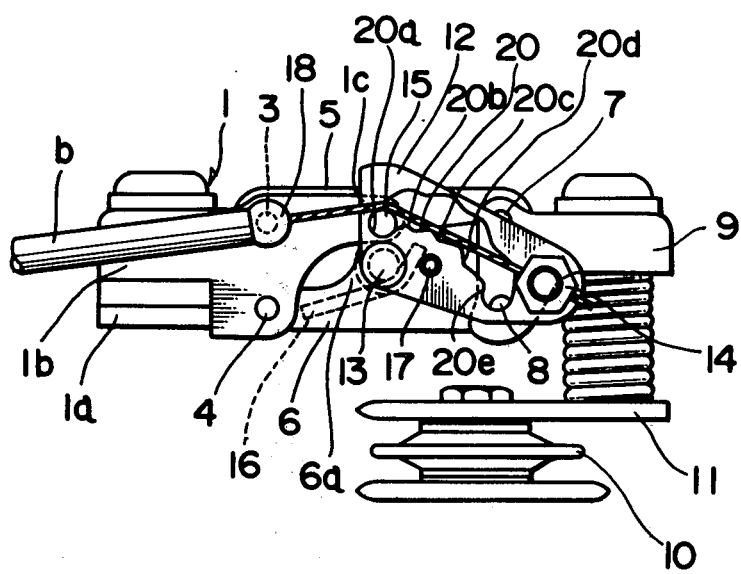
Figure 3:
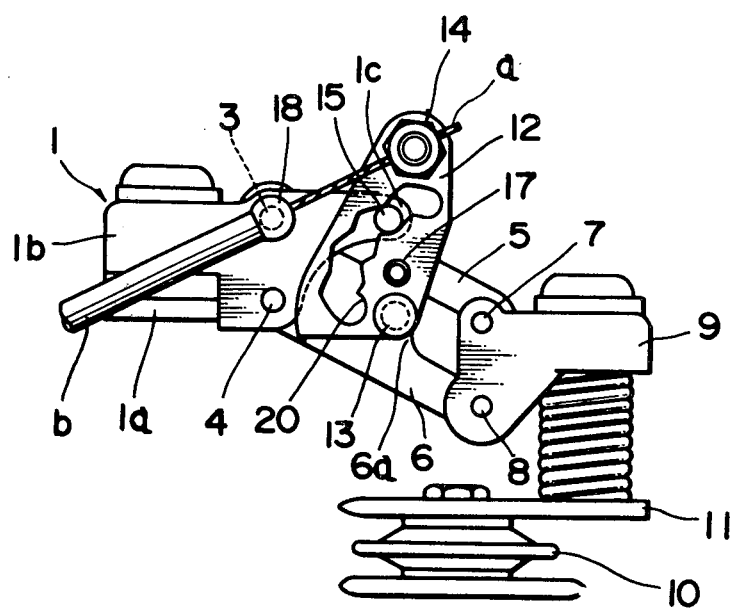
Figure 4:
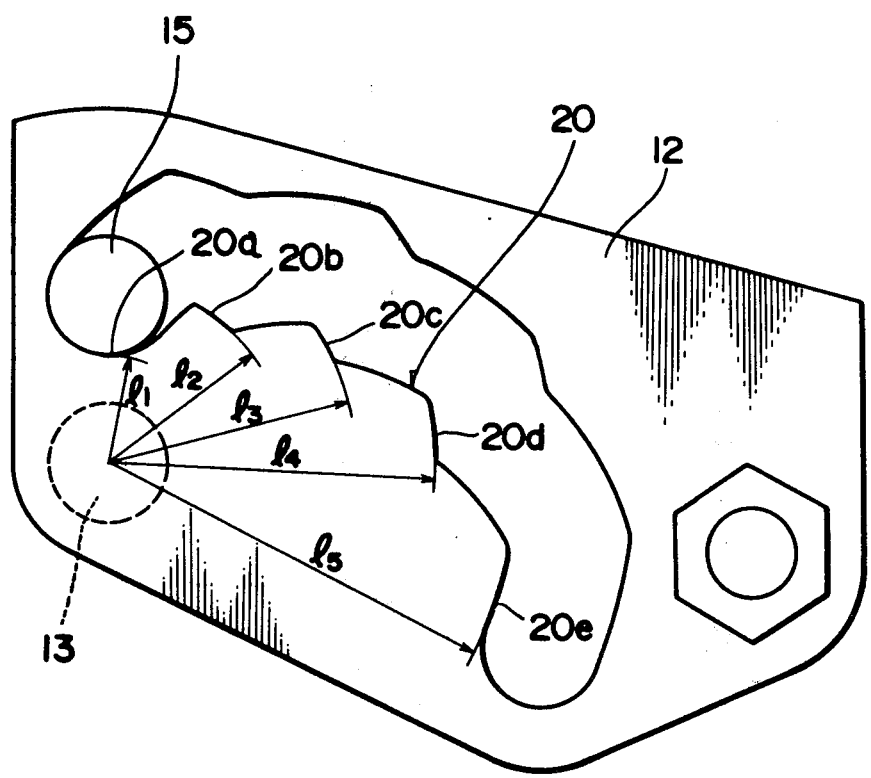
Figure 5:
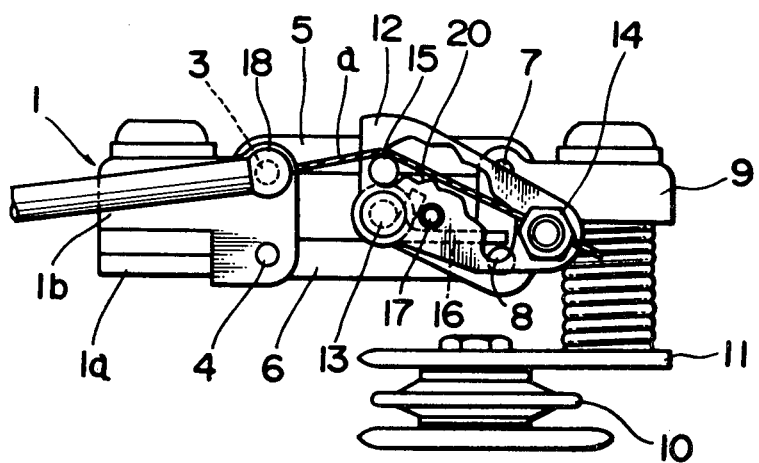
Figure 6:
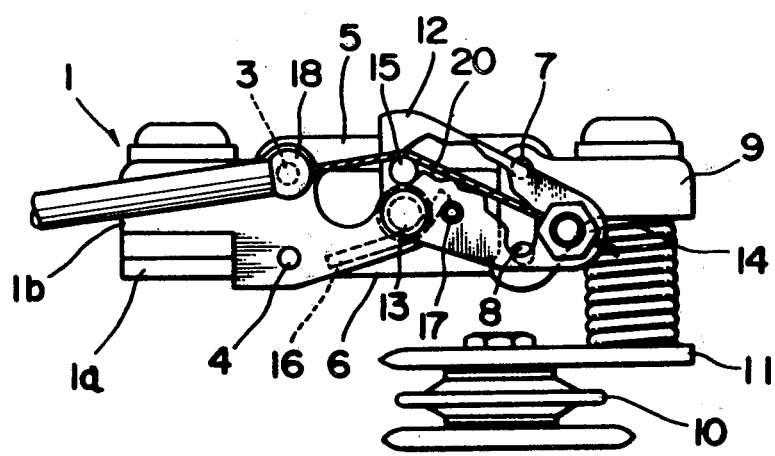

The above objects of the invention and others will be apparent from the following description in accordance with the accompanying drawings, in which FIG. 1 is a front view of the derailleur of the invention, which has the cam plate mounted to the linkage members and the pin to the mounting member, FIG. 2 is a bottom view thereof, FIG. 3 is a bottom view of the derailleur in FIGS. 1 and 2, showing its controlled condition, FIG. 4 is an enlarged plan view of the cam plate only, FIG. 5 is a bottom view of the derailleur provided with the cam plate attached to the movable member and the pin to the linkage member, and FIG. 6 is a bottom view of the derailleur having the cam plate attached to the mounting member and the pin to the linkage member.

The derailleur of the invention is, as shown in FIGS. 1 through 3 and FIGS. 5 and 6, basically composed of four members, such as, a first fitting member 1, and second and third two parallel linkage members 5 and 6, and a fourth movable member 9. The fitting member 1 comprises a bracket 1a fixed to a fork end (not shown) together with a hub shift (not shown) of a bicycle and a fitting body 1b mounted to the bracket 1a through a pivot 2 in movable relation in a given range. The body 1b is rotatable with respect to the bracket 1a but is in rigid non-rotatable relation with the movable member 9.

The body 1b is provided at one side thereof with opposite noses to which two linkage member 5 and 6 are pivotally supported at each one end thereof through two pins 3 and 4.

The linkage members 5 and 6, equal in length and of a C-like shape section respectively, are mounted to the body 1b of the fitting member opposite to each outer at end open side of the same. At the foremost ends of the linkage members is pivotally supported the movable member 9 through pins 7 and 8.

The movable member 9 is formed substantially similarly to the body 1b, which has at one side thereof two opposite noses pivotally supporting the linkage member 5 and 6 therebetween through the pins 7 and 8 in the relationship that both the movable member and the linkage members are swingingly movable with each other. At the other side of the movable member 9 are mounted cages 11 carrying two chain-guide pulleys 10 therebetween through a pivot in rotatable relation in a given range only respectively.

The chain-guide pulleys 10 serve to carry a driving chain (not shown) thereon and move in the axial direction of the multi-speed transmitting freewheel (not shown) so that the chain may be introduced from the pulleys to a selective sprocket of the freewheel to be in engagement therewith for changing the speed of the bicycle.

The basic construction of the derailleur has been described as aforegoing, which is not different at all from a well known one.

The invention is directed to provide in the derailleur constructed as aforegoing a positioning device described hereinafter between two members relatively movable with respect each other during its speed-change operation, namely, between; the fitting member 1 and the movable member 9 or the linkage member 5 or 6; the movable member 9 and the linkage member 5 or 6, or the two linkage members 5 and 6. The positioning device serves to selectively determine the proper position where the chain-guide pulleys 10 are to be kept during speed-change operation, and comprises a cam plate 12 having a cam face 20 formed of notches 20a, 20b, 20c, 20d and 20e which corresponds to the number of the speed change stages.

Now, the derailleur, which is so constructed that the cam plate is mounted to the linkage member 6 and the pin 15 to the body 1b of the fitting member 1, will be described referring to FIGS. 1 to 3 as follows.

The linkage member 6 projects, as shown in FIGS. 2 and 3, at its middle portion towards the opposite linkage member 5 to form a tongue 6a for mounting the cam plate 12 therewith. Also, the body 1b is, as shown in FIGS. 2 and 3, extended at its one side, i.e., at the bottom nose, towards the movable member 9, which extension 1c is positioned at its tip nearby the cam plate 12, the mounting tongue 6a at the linkage member 6 being provided with the cam plate 12 through the pivot 13 in rotatable relation with the tongue 6a.

The cam plate 12 is, as shown in FIGS. 2 and 3, provided at its one end opposite to the pivot 13 with a retainer 14 for the control wire a. The retainer 14 is, as is well known, composed of a bolt having at its middle portion a hole through which the wire extends and a nut, and is located at one swingable end portion of the cam plate around the pivot 13 for the operation of the control wire a.

The cam face 20 of the cam plate 12 is formed at its inside face of five notches 20a to 20e corresponding to each of the speed-change stages when the guide cages 11 are displaced at five steps for changing the bicycle speed in five stages. Each of the notches 20a to 20e is, as shown in FIG. 4, formed in an arced-shape of a part of a circumference of each circle concentered with the pivot 13. Each of the arced faces 20a to 20e is spaced from the center of the pivot 13 in the following manner that a distance $l_1$ between the first notch 20a and the pivot 13 is the shortest as the base, from which $l_1$ distances $l_2$, $l_3$, $l_4$, and $l_5$, are sequentially increased in length corresponding to the displacement degree in the bicycle speed change respectively, where each of the notches 2a to 20e is connected with each other through a face of a slant line.

The cam face 20 may, as shown in FIGS. 2, 3 and 4, be formed at the inner face of an elongated curved hole larger in width than the outer diameter of the pin 15, or formed at the outer end face of the cam plate 12. The pin 15 is fixed to the extension 1c of the tongue of the body 1b of the fitting member 1, projects towards the cam plate 12, comes in contact at the lengthwise middle portion of the pin with the cam face 20, and is selectively engaged with the notches 20a to 20e respectively.

When the cam plate 12 rotates around the pivot 13, the cam face 20 changes its position of contact with the pin 15 to forcibly swing the linkage member 6 so that the guide frame 11 may be displaced.

Referring to the drawings, the reference numeral 16 denotes a return spring surrounding the pivot 13, the return spring 16 being retained at its one end to the linkage member 6 and at the other end to a stopper 17 provided at the cam plate 12.

The reference numeral 18 denotes a retainer for the outer cable b, which is non-rotatably mounted to the body 1b.

In the above construction of the derailleur, a control lever (not shown) is turned to pull the wire a for changing the bicycle speed so that the cam plate 12 swings around the pivot to allow the cam face 20 to shift its portion in contact with the pin 15 from, for example, the first notch 2a to the second notch 20b, wherein the distance $l_2$ between the pivot 13 and the second notch 20b is larger than the distance $l_1$ between the former and the first notch 20a, so that the linkage member 6 having the cam plate 12 pivoted thereto is forced to swing. Hence, the other linkage member 5 and the movable member 9 swing so that a drive chain (not shown) may be shifted to a desirable sprocket through the guide cages 11 for changing the bicycle speed.

In this instance, the slant faces connecting each of the notches 20a to 20e are brought into contact with the pin 15 for moving the guide cages 11 through the linkage member 6. When the pin 15 transfers from the slant face to the next notch, that is, the pin rides on the next notch, for example, the second notch 20b, the linkage member 6 cannot swing so far as the pin is not engageable with the following slant face even though the cam plate 12 continues to swing within the range of the length the notch 20b.

Accordingly, when the pin 15 transfers in contact with the cam face 12 from the first slant face to the second notch 20b, the derailleur is idling during the time the pin 15 is in contact with the latter until it shifts to the following slant face so that the cyclist may clearly judge the pin 15 is in contact with the notch 20b, whereby the drive chain may properly be positioned to a selective sprocket of the freewheel.

In the above embodiment, the cam plate 12 is mounted to the linkage member 6 and the pin 15 to the fitting member 1. Also, the cam plate may be mounted to the movable member 9 and the pin 15 to the linkage member 5. Further the cam plate 12 may, as shown in FIG. 6, be mounted to the fitting member and the pin 15 to the linkage member 5.

In addition, being not shown in the drawing, the cam plate 12 may be mounted to the linkage member 5 opposite the linkage member 6. When the cam plate 12 is mounted to either of the linkage members 5 or 6, the pin 15 may be fixed to the movable member 9 or one of the linkage members 6 or 5 opposite to other linkage members 5 or 6, provided with the cam plate, other than the fitting member 1 as shown in FIGS. 1 to 3. When the cam plate 12 is, as shown in FIG. 5, mounted to the movable member 9, the pin 15 may be mounted to the other linkage member 6 or the fitting member 1 other than the one linkage member 5. When the cam plate 12 is, as shown in FIG. 6, mounted to the fitting plate member 1, the pin 15 may be mounted to the other linkage member 6 or the movable member 9 other than the one linkage member 5. When the cam plate 12 is, as shown in FIG. 5, mounted to the movable member 9, the latter is partially extended to the middle portion of the linkage member 6 to form an extension of which an idle end rotatably pivotally supports the cam plate 12 as aforesaid. When the cam plate 12 is, as shown in FIG. 6, mounted to the fitting member 1, the fitting body 1b is partially extended towards the movable member 9 to form an extension 1d which is positioned at its tip in the middle portion of the linkage member 6 to be pivoted with the cam plate 12 through the pivot 13.

As clearly understood from the above description, the derailleur of the invention effects the bicycle speed change by turning the cam plate to shift the cam face in contact with the pin so that the movable member may travel. Therefore, the cam face formation, which step by step corresponds to the speed change stages, makes it possible to change the bicycle speed gradually in divided steps with each of the speed change stages.

Accordingly, the speed change operation may be carried out accurately and exactly and further the cam face is formed of notches having a given length respectively so that the operation may always be proper regardless of the extension of the operating wire thereby obtaining constantly proper speed change operation.

While the form of embodiment of the invention as herein disclosed constitutes a preferred form, it is to be understood that other forms might be adopted, all coming within the scope of the claims which follow.

What is claimed is:

1. A derailleur for a bicycle, which is adapted to change the bicycle speed by shifting a drive chain to one sprocket of a freewheel by means of a pull of a control wire, comprising:
    a. a first fitting member, second and third linkage members pivoted at one end of the fitting member respectively, and a fourth movable member rotatably supported at its one end to the other end of each of the linkage members,
said linkage members being swingable with respect to said fitting member, said movable member being swingable with respect to said linkage members and movable with respect to said fitting member,
    b. cages connected to the other end of said movable member, said cages carrying guide pulley means and moving together with said movable member to guide said drive chain therewith,
    c. a cam plate pivotally supported at its one end to one of said four members in swingable relation therewith,
said cam plate having a cam face of a plurality of notches and a retainer attached to the other end opposite to said pivoted one end of the cam plate for retaining a terminal of the control wire, and
    d. a pin fixed to a member, movable relative to said one member pivotally supporting said cam plate among said four members,
said pin being movable into contact with said cam face to be engaged with said notches respectively.

2. The derailleur according to claim 1, wherein said cam plate is pivotally supported by said first fitting member and said pin is fixed to one of said second and third linkage members swingable with respect to said first fitting member and said fourth movable member.

3. The derailleur according to claim 2, wherein said pin is fixed to said movable member.

4. The derailleur according to claim 2, wherein said pin is fixed on one of said linkage members.

5. The derailleur according to claim 2, wherein one end of said fitting member is extended towards said fourth movable member to form an extension, said extension having a tip positioned substantially at a lengthwise middle portion of one of said linkage members and having said cam plate pivoted thereto.

6. The derailleur according to claim 1, wherein said cam plate is pivotally supported by said fourth movable member and said pin is fixed to one of said first fitting member and said second and third linkage members, which are movable relative to said movable member.

7. The derailleur according to claim 6, wherein said pin is fixed to said fitting member.

8. The derailleur according to claim 6, wherein said pin is fixed to one of said linkage members.

9. The derailleur according to claim 6, wherein said movable member is extended at its one end towards said fitting member to form an extension, said extension having a tip positioned substantially at a lengthwise middle portion of one of said linkage members and having said cam having plate pivoted thereto.

10. The derailleur according to claim 1, wherein said cam plate is pivotally supported by one of said second and third linkage members and said pin is fixed to one of the other of said linkage members, said first fitting member and said fourth movable member, which are movable relative to said one of the second and third linkage members respectively.

11. The derailleur according to claim 10, wherein said pin is fixed to said fitting member.

12. The derailleur according to claim 10, wherein said pin is fixed to said movable member.

13. The derailleur according to claim 10, wherein said pin is fixed to said the other linkage member movable relative to said one linkage member pivotally supported by said cam plate.

14. The derailleur according to claim 1, wherein said cam plate comprises a plate member, said cam plate having an elongated curved hole defined therethrough, said hole being larger in width than the diameter of said pin, said hole having said plurality of notches at the inner surface thereof.

15. The derailleur according to claim 1, wherein said notches of said cam face of said cam plate are formed in arcs of circles concentrated with said pivot at said cam plate respectively, next adjacent ones of said notches being connected to each other with a slant face.

* * * * *